(12) United States Patent
Zhao et al.

(10) Patent No.: US 12,469,173 B2
(45) Date of Patent: Nov. 11, 2025

(54) OBJECT POSITIONING METHOD, MACHINING METHOD, APPARATUS, DEVICE, AND MEDIUM

(71) Applicant: MAKEBLOCK CO., LTD., Guangdong (CN)

(72) Inventors: Zuoliang Zhao, Guangdong (CN); Liji Diao, Guangdong (CN)

(73) Assignee: MAKEBLOCK CO., LTD., Guangdong (CN)

( * ) Notice: Subject to any disclaimer, the term of this patent is extended or adjusted under 35 U.S.C. 154(b) by 0 days.

(21) Appl. No.: 18/960,317

(22) Filed: Nov. 26, 2024

(65) Prior Publication Data
US 2025/0095205 A1    Mar. 20, 2025

Related U.S. Application Data

(63) Continuation of application No. PCT/CN2024/102321, filed on Jun. 28, 2024.

(30) Foreign Application Priority Data

Jun. 28, 2023 (CN) .......................... 202310782610.0
Jun. 29, 2023 (CN) .......................... 202310792539.4
(Continued)

(51) Int. Cl.
*G06T 7/80* (2017.01)
*G01B 11/00* (2006.01)
(Continued)

(52) U.S. Cl.
CPC .............. *G06T 7/80* (2017.01); *G01B 11/002* (2013.01); *G06T 7/60* (2013.01); *B23K 26/702* (2015.10); *G06T 2207/30204* (2013.01)

(58) Field of Classification Search
CPC ... G06T 7/80; G06T 7/60; G06T 2207/30204; G01B 11/002; B23K 26/702
(Continued)

(56) References Cited

U.S. PATENT DOCUMENTS

| 6,915,228 B2 * | 7/2005 | Uffenkamp | ............... G06T 7/80 |
| | | | 701/1 |
| 9,068,820 B2 * | 6/2015 | Kosmecki | .............. A61B 34/20 |

(Continued)

FOREIGN PATENT DOCUMENTS

| CN | 102207368 | 10/2011 |
| CN | 102721364 | 10/2012 |

(Continued)

OTHER PUBLICATIONS

WIPO, International Search Report for PCT/CN2024/102321, Sep. 26, 2024.

*Primary Examiner* — Trang U Tran
(74) *Attorney, Agent, or Firm* — Hodgson Russ LLP

(57) ABSTRACT

An object positioning method provided in the present disclosure includes obtaining an initial image of a machining region when a to-be-machined object is placed in the machining region; recognizing the position marking point and the height marking point contained in the initial image; and recognizing a size of the to-be-machined object and a position of the to-be-machined object in the machining region based on the position marking point and the height marking point in the initial image.

20 Claims, 6 Drawing Sheets

---

Obtaining Initial Image of Machining Region When To-be-machined Object is Placed in Machining Region, Machining Region is Provided with Position Marking Point and Height Marking Point Around To-be-machined Object — S100

↓

Recognizing Position Marking Points and Height Marking Points Contained in Initial Image — S200

↓

Based on Position Marking Points and Height Marking Points in Initial Image, Recognizing Size of To-be-machined Object and Position of To-be-machined Object in Machining Region — S300

(30) Foreign Application Priority Data

Jun. 21, 2024 (CN) .......................... 202410808650.2
Jun. 21, 2024 (CN) .......................... 202410808652.1

(51) Int. Cl.
*G06T 7/60* (2017.01)
*B23K 26/70* (2014.01)

(58) Field of Classification Search
USPC ........................................................ 348/180
See application file for complete search history.

(56) References Cited

U.S. PATENT DOCUMENTS

| | | | | |
|---|---|---|---|---|
| 11,613,021 | B2* | 3/2023 | Mase | ...................... B25J 9/1697 |
| | | | | 700/259 |
| 2011/0234789 | A1* | 9/2011 | Koike | .............. G05B 19/41805 |
| | | | | 348/95 |

FOREIGN PATENT DOCUMENTS

| | | |
|---|---|---|
| CN | 103499297 | 1/2014 |
| CN | 104786226 | 7/2015 |
| CN | 108195319 | 6/2018 |
| CN | 109215075 | 1/2019 |
| CN | 110740841 | 1/2020 |
| CN | 113660473 | 11/2021 |
| CN | 114310940 | 4/2022 |
| JP | H05301183 | 11/1993 |

* cited by examiner

OBJECT POSITIONING METHOD, MACHINING METHOD, APPARATUS, DEVICE, AND MEDIUM

CROSS-REFERENCE TO RELATED APPLICATIONS

Application No. This application is continuation of International PCT/CN2024/102321, filed Jun. 28, 2024, which claims priority to Chinese Patent Application No. 202410808652.1, filed on Jun. 21, 2024, Chinese Patent Application No. 202310792539.4, filed on Jun. 29, 2023, Chinese Patent Application No. 202410808650.2, filed on Jun. 21, 2024, and Chinese Patent Application No. 202310782610.0, filed on Jun. 28, 2023. The entire disclosures of the above-identified applications are hereby incorporated herein by reference.

TECHNICAL FIELD

The present disclosure belongs to the field of machining technology, and specifically relates to an object positioning method, apparatus, device, and medium.

BACKGROUND

In a machining process, an object needs to be recognized and positioned to obtain a position of the object and then the object is machined.

SUMMARY

According to a first aspect of embodiments of the present disclosure, there is provided an object positioning method, which includes:
  obtaining an initial image of a machining region when a to-be-machined object is placed in the machining region, the machining region is provided with a position marking point and a height marking point around the to-be-machined object;
  recognizing the position marking point and the height marking point contained in the initial image; and
  recognizing a size of the to-be-machined object and a position of the to-be-machined object in the machining region based on the position marking point and the height marking point in the initial image.

According to a second aspect of embodiments of the present disclosure, there is provided an object positioning apparatus, which includes:
  an image acquisition module, configured for obtaining an initial image of a machining region when a to-be-machined object is placed in the machining region, wherein the machining region is provided with a position marking point and a height marking point around the to-be-machined object;
  a marking point recognition module, configured for recognizing the position marking point and the height marking point contained in the initial image; and
  an object positioning module, configured for recognizing a size of the to-be-machined object and a position of the to-be-machined object in the machining region based on the position marking point and the height marking point in the initial image.

According to a third aspect of embodiments of the present disclosure, there is provided a machining device, which includes:

a mapping relation construction module, configured for based on a plurality of calibration points provided on a first base plate in the machining region, constructing a mapping relationship between position coordinates of points in the machining region and motion displacement coordinates of a machining head moving to the points in the machining region;
  an image acquisition module, configured for after a to-be-machined object is placed on a second base plate, obtaining an initial image of the second base plate when the to-be-machined object is placed in the second base plate, wherein the second base plate is provided with a position marking point and a height marking point around the to-be-machined object;
  a marking point recognition module, configured for recognizing the position marking point and the height marking point contained in the initial image;
  an object positioning module, configured for obtaining position data of the to-be-machined object on the second base plate based on the position marking point and the height marking point in the initial image; and
  a machining control module, configured for generating a machining instruction based on the position data of the to-be-machined object on the second base plate and the mapping relationship.

According to a fourth aspect of embodiments of the present disclosure, there is provided an electronic device, which includes a memory, a processor and an object positioning program stored on the memory and operable on the processor, wherein the object positioning program, when executed by the processor, implements the object positioning method as mentioned above or the machining method as mentioned above.

According to a fifth aspect of embodiments of the present disclosure, there is provided a non-transient storage medium, on which a computer program is stored on, the computer program, when executed by the processor, implements the object positioning method as mentioned above or the machining method as mentioned above.

BRIEF DESCRIPTION OF THE DRAWINGS

In order to more clearly illustrate the technical solutions of the embodiments of the present disclosure, the accompanying drawings to be used in the description of the embodiments of the present disclosure will be briefly introduced below, and it will be obvious that the accompanying drawings in the following description are only some of the embodiments of the present disclosure, and that other accompanying drawings may be obtained according to these drawings for those skilled in the field without any creative labor.

DETAILED DESCRIPTION OF THE EMBODIMENTS

Embodiments will now be described more fully with reference to the accompanying drawings. However, embodiments can be implemented in a variety of forms and should not be construed as limitation to the examples set forth herein; rather, the provision of these embodiments allows for the description of the present disclosure to be more comprehensive and complete and conveys the idea of embodiments in a comprehensive manner to those skilled in the art.

In addition, the features, structures, or characteristics described may be combined in one or more embodiments in any suitable manner. In the following description, many specific details are provided thereby giving a full understanding of the embodiments of the present disclosure. However, those skilled in the art will realize that it is possible to practice the technical embodiments of the present disclosure and omit one or more of the particular details, or that other methods, groups of elements, apparatus, steps, etc. may be employed. In other cases, the publicly known methods, apparatus, implementations, or operations are not shown or described in detail to avoid obscuring aspects of the present disclosure.

The block diagrams shown in the accompanying drawings are merely functional entities and do not necessarily have to correspond to physically separate entities. That is, the functional entities may be implemented in software form, or in one or more hardware modules or integrated circuits, or in different networks and/or processor devices and/or microcontroller devices.

The flowcharts shown in the accompanying drawings are only exemplary illustrations and it is not necessary to include all elements and operations/steps, nor is it necessary to perform them in the order depicted. For example, some of the operations/steps may also be decomposed, and some of the operations/steps may be combined or partially combined, so that the actual order of execution is likely to change depending on the actual situation.

The technical solutions of the object positioning method, apparatus, device, and medium provided in the present disclosure are described in detail below in connection with specific embodiments.

It should be noted that in the related technology, during laser machining, the to-be-machined object first needs to be recognized and positioned, and the method of recognizing and positioning the object includes fixing a cushion with a groove at a specific position on a machining surface, and placing an object in the groove of the cushion to be machined by a machining device for the groove. However, the above method requires the preparation of cushions with grooves corresponding to the shape of different objects, which seriously affects the machining efficiency, and the manufacturing of multiple sizes of cushions greatly increases the production cost.

Figure 1:
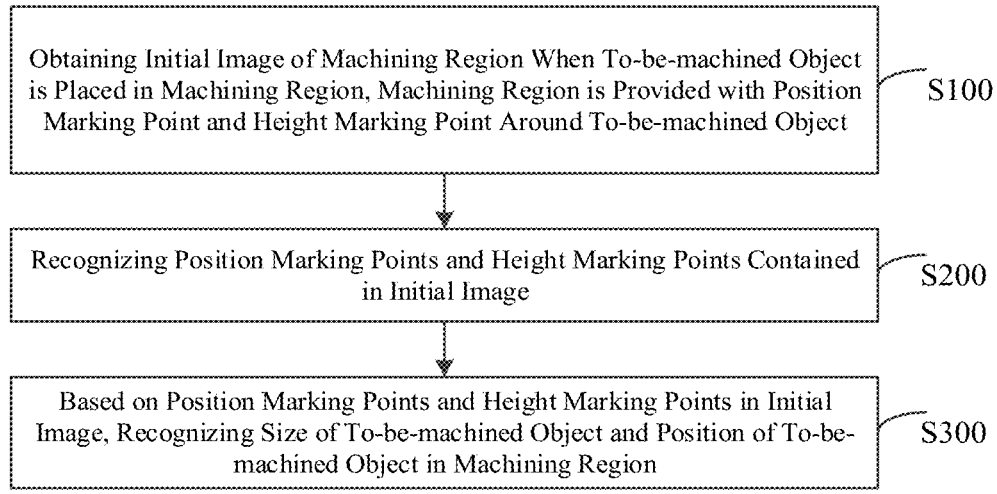
FIG. 1 is a flowchart of a method for positioning an object according to some embodiments of the present disclosure.

In order to solve the above technical problems, FIG. 1 is a flowchart of an object positioning method in some embodiments of the present disclosure, as shown in FIG. 1, which may be used in a machining device or a mobile terminal, the mobile terminal includes, but not limited to, a cellular phone, a tablet, a computer, etc.

As shown in FIG. 1, the object positioning method provided in the present embodiment may mainly include steps S100 to steps S300 as follows.

S100, obtaining an initial image of a machining region when a to-be-machined object is placed in the machining region, the machining region is provided with a position marking point and a height marking point around the to-be-machined object.

Specifically, the machining device has a machining region, and the machining region includes a machining surface and position marking points and height marking points provided around the machining surface. The machining surface can be processed by the machining device, the to-be-machined object can be placed in the machining surface. The position marking points and the height marking points can include a two-dimensional code, a logo graphic, or other patterns that can be recognized by the machine. There may be a plurality of position marking points, such as two, three, four, or more, and the plurality of position marking points are in the same height, and the plurality of position marking points may be enclosed to form a uniquely determined graphic. The heights of the position marking points and the height marking points are different, and the height marking points may be higher than the position marking points. The position marking points and the height marking points may have different markings (e.g., patterns, QR codes, etc.) to distinguish the position marking point from the height marking point. There is at least one height marking point, such as one, two, three, four, or more.

Compared to the related technology in which a soft cushion for placing the to-be-machined object is provided in the machining surface, the present embodiment provides a plurality of position marking points and height marking points around the machining surface, so that when the to-be-machined object is placed in the machining surface and prepared to be machined, the machining device can determine the size and position of the to-be-machined object according to the position marking points and the height marking points.

Figure 2:
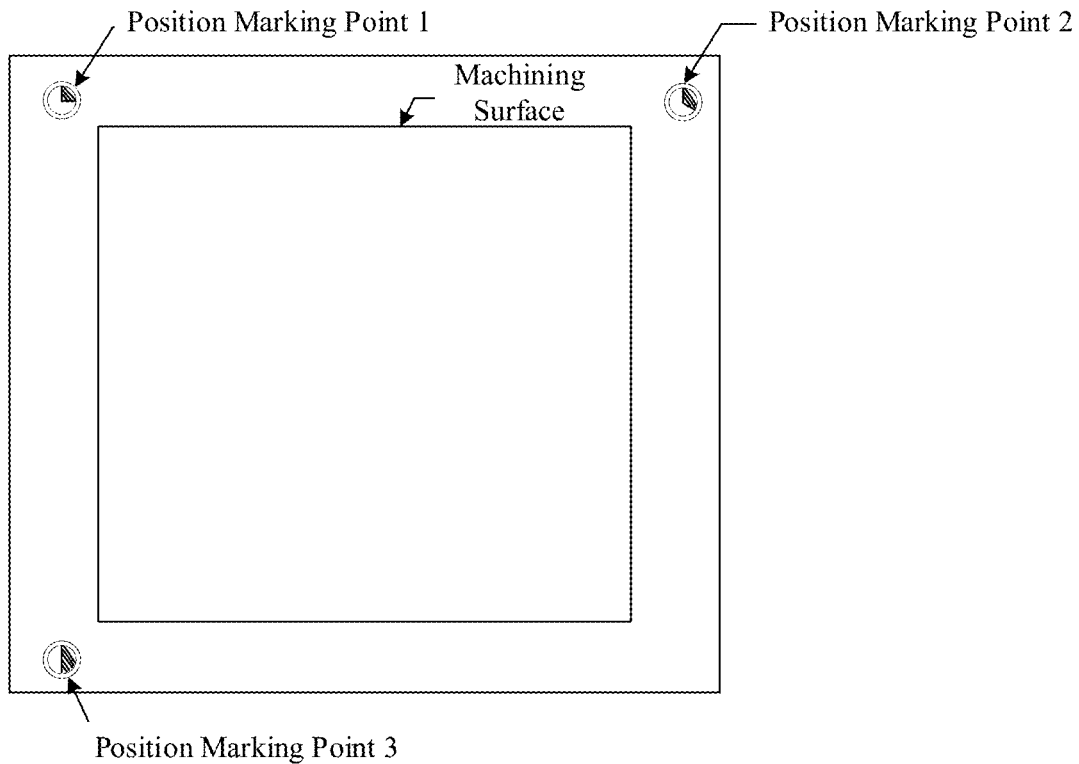
FIG. 2 is a schematic diagram of the effect of providing position marking points according to some embodiments of the present disclosure.

FIG. 2 is a schematic diagram of the effect of setting the position marking points.

As shown in FIG. 2, in some embodiments, a position marking point 1, a position marking point 2, and a position marking point 3 are provided at the same height around the machining surface, and the position marking point 1, the position marking point 2, and the position marking point 3 are not in a straight line, so that the position marking point 1, the position marking point 2, and the position marking point 3 can be enclosed to form a triangulation.

Figure 3:
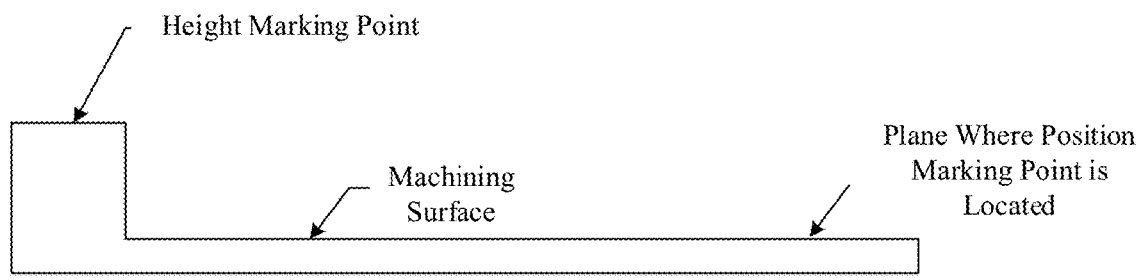
FIG. 3 is a schematic diagram of a positional relationship between a height marking point and a position marking point according to some embodiments of the present disclosure.

FIG. 3 is a schematic diagram of the positional relationship between the height marking point and the position marking point.

As shown in FIG. 3, the height marking points differ from the position marking points in height, and the height difference between the height marking point and the position marking point is known.

The initial image includes the to-be-machined object, the position marking point, and the height marking point. When the to-be-machined object is placed in the machining region, the initial image may be obtained by shooting the machining region with a shooting device.

Figure 11:
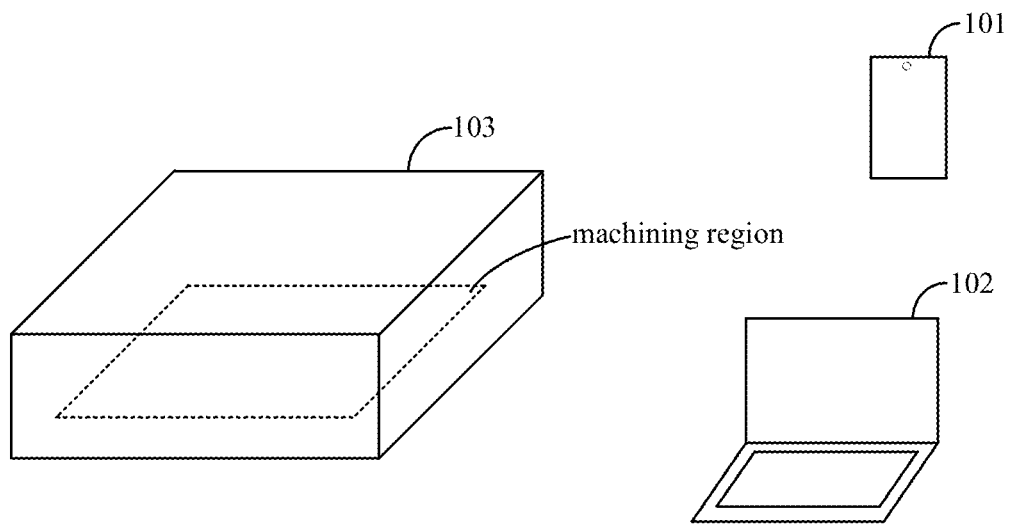
FIG. 11 is a schematic diagram of an application scenario according to some embodiments of the present disclosure.

As shown in FIG. 11, The shooting device may be a camera set in the interior of the machining device, or a handheld shooting device 101 (such as a cell phone, tablet, camera, etc.), and the positioning of the handheld shooting device 101 obtains the image to position, which can make the machining device 103 that does not have a camera also be able to taking photos to position the to-be-machined object. The execution subject of the object positioning method may be the handheld shooting device 101 itself, or a terminal 102 (e.g., a laptop computer, a desktop computer, etc.) that communicates with the handheld shooting device 101, or the machining device 103 itself that communicates with the handheld shooting device 101.

In some embodiments, the initial image includes at least N different position marking points, N is less than 2, the value of N is related to direction attributes of the position marking points, each direction attribute is a number of directions indicated by the position marking points.

At least N different position marking points are required to enclose to form a known and unique graphic, i.e., an enclosure region. Based on the number of directions indicated by the direction attribute of the position marking points, the minimum number of position marking points that need to be captured when shooting the initial image can be confirmed, so that the initial image can satisfy the requirement of positioning. It is understood that in the mathematical concept, for a point without direction or with only one direction, at least three points that are not co-linear are required to determine a plane, whereas for points that have a direction attribute (e.g., a point that can indicate two or more directions), only two points are required to determine a plane. That is, N=3 when each position marking point can indicate one direction or cannot indicate a direction, and N=2 when each position marking point can indicate more than two directions.

When the machining device is provided with N position marking points without leaving redundant marking points, the shooting device needs to shoot the height marking points and all position marking points when shooting the initial image. When the machining device is provided with M (M>N) position marking points inside, i.e., redundant marking points are left, then when the shooting device shoots the initial image, it needs to shoot the height marking points and at least N position marking points, i.e., the shooting device may shoot the height marking points and all position marking points or some position marking points.

S200, recognizing the position marking points and height marking points contained in the initial image.

Specifically, the initial image may be processed (e.g., pre-processing such as denoising, contrast adjustment, etc.), and then the position marking points and the height marking points in the initial image may be recognized by image recognition, etc. Specifically, the corresponding position marking point and height marking point in the initial image may be recognized according to the attributes of the position marking points (marking pattern, recognition code, etc.) and the attributes of the height marking points (marking pattern, recognition code, etc.). For example, when setting the position marking point and the height marking point, different recognition codes are assigned to the position marking point and the height marking point, and thus, when recognizing the marking point, the position marking point and the height marking point can be distinguished according to the recognition codes. The different position marking points have different attributes so as to facilitate the differentiation of each position marking point. For example, as shown in FIG. 2, the position marking point 1, the position marking point 2, and the position marking point 3 have different patterns, and the position marking point 1, the position marking point 2, and the position marking point 3 may be distinguished based on the patterns so as to facilitate the subsequent construction of the enclosure region based on the position marking points.

S300, based on the position marking points and the height marking points in the initial image, recognizing a size of the to-be-machined object and a position of the to-be-machined object in the machining region.

The shooting height of the initial image may be determined based on the position marking points and the height marking points in the initial image, and the size of the to-be-machined object and the position of the to-be-machined object in the machining region may be recognized based on the relative positional relationship between the to-be-machined object and the position marking points, combined with the shooting height.

In this embodiment, by obtaining the initial image of the machining region when the to-be-machined object is placed in the machining region, and by setting the position marking point and the height marking point around the to-be-machined object, the enclosure region can be determined by the position marking point, and the size and position of the to-be-machined object can be recognized based on the relationship of the relative position between the to-be-machined object and the initial enclosure image, and the height marking point, which improves machining efficiency and accuracy at a certain degree. The various shapes of to-be-machined object can be positioned, without the need to set different shapes of cushions for different shapes of to-be-machined objects, which is relatively low-cost and easy to operate.

In some embodiments, S300, the recognizing the size of the to-be-machined object and the position of the to-be-machined object in the machining region based on the position marking point and the height marking point in the initial image includes:

S301, recognizing the size of the to-be-machined object and the position of the to-be-machined object in the machining region based on a relative positional relationship between the to-be-machined object and the position marking point, and a relative positional relationship between the height marking point and the position marking point in the initial image.

A height of the shooting device relative to the position marking point may be calculated based on the relative positional relationship between the height marking point and the position marking point, and the size and position of the to-be-machined object may be determined using a principle such as triangulation based on the relative positional relationship between the to-be-machined object and the position marking point in the initial image, and in combination with the height of the shooting device.

In some embodiments, step S301 includes the following steps S310 and S320.

S310, determining an initial enclosure region in the initial image based on the position marking point in the initial image.

All or some of the position marking points in the initial image may be sequentially connected together to enclose a region formed as the initial enclosure region. When there are N position marking points in the initial image, then the N position marking points may be sequentially connected together to form a region as the initial enclosure region. When there are L (N<L≤M) position marking points in the initial image, then at least N position marking points may be sequentially connected together to form a region as the initial enclosure region.

S320, recognizing the size of the to-be-machined object and the position of the to-be-machined object in the machining region based on the height marking point and the position marking point in the initial image, and the initial enclosure region.

Specifically, based on the relative positional relationship between the to-be-machined object and the initial enclosure region, and the height marking point, the size and position of the to-be-machined object can be determined by the principle such as triangulation, so that the to-be-machined object can be accurately machined.

In some embodiments, S320, recognizing the size of the to-be-machined object and the position of the to-be-machined object in the machining region based on the height marking point in the initial image and the initial enclosure region includes:

S321, comparing a shape of the initial enclosure region with a preset standard shape to determine image calibration parameters;

S322, calibrating the initial image based on the image calibration parameters to obtain a calibrated image;

S323, obtaining a target enclosure region formed by enclosure of a plurality of position marking points in the calibrated image; and S324, recognizing the size of the to-be-machined object and the position of the to-be-machined object in the machining region based on the position marking point, the height marking point, and the target enclosure region in the calibrated image.

Specifically, due to the problem of "the closer the bigger and the smaller the further" caused by different shooting angles and lens distortion, the shape of the initial enclosure region in the initial image may differ greatly from the actual enclosure shape (i.e., geometric distortion) due to the shooting angle and distortion of the initial image. In order to minimize the geometric distortion caused by the shooting angle and to make the position and proportion of the objects in the image more accurate, the initial image can be calibrated.

The image calibration parameters can be determined by comparing the shape of the initial enclosure region with a preset standard shape. The image calibration parameters are used to calibrate the initial image to eliminate geometric distortions and make the initial image more accurate. The initial image may be calibrated based on the image calibration parameters to obtain a calibrated image. For example, a geometry calibration related algorithm may be used to calibrate the initial image to obtain the calibrated image. The preset standard shape may be the shape of the preset enclosure region formed by the enclosure of the corresponding position marking points inside the machine in the front view angle, and may be preset in a memory; or, a preset image may be obtained by the shooting device shooting an interior of the machine in the preset view angle, and the preset enclosure region is formed by the enclosure of the corresponding position marking points in the preset image, and the preset view angle may be the front view angle, other view angles can be set according to the machining scene.

After obtaining the calibrated image, the position marking points and the height marking points in the calibrated image may be recognized, and then the position marking points are enclosed to form a target enclosure region, and the size and position of the to-be-machined object may be determined based on the position marking points, the height marking points, and the target enclosure region in the calibrated image.

In this embodiment, the initial image is calibrated to obtain the calibrated image, and the position marking points in the calibrated image are recognized to obtain the target enclosure region, to ensure that the recognized position of the to-be-machined object is accurate.

In some embodiments, S324, the recognizing the size of the to-be-machined object and the position of the to-be-machined object in the machining region based on the position marking point, the height marking point, and the target enclosure region in the calibrated image includes:

S3241, obtaining a first relative positional relationship between the position marking point and the height marking point in the calibrated image;

S3242, calculating a second relative positional relationship based on the first relative positional relationship, wherein the second relative positional relationship is a distance in a vertical direction between the shooting device and the to-be-machined object; and S3243, recognizing the size of the to-be-machined object and the position of the to-be-machined object in the machining region based on the second relative positional relationship and the target enclosure region.

Specifically, after recognizing the position marking points and the height marking points in the calibration image, a first relative positional relationship of one or more of the position marking points and the height marking points may be determined. It is noted that the first relative positional relationship is a pixel distance between the position marking point and the height marking point in the calibrated image.

Since the first relative positional relationship is different in the image captured at different shooting heights, the distance between the shooting device and the machining surface in the vertical direction can be calculated by using principles such as triangulation based on the first relative positional relationship in combination with the height difference between the position marking point and the height marking point, and the actual distance between the position marking point and the height marking point in the machining surface. And then based on the calculated distance and the thickness of the to-be-machined object, the distance between the shooting device and the to-be-machined object in the vertical direction can be calculated, i.e., the height of the shooting device relative to the to-be-machined object, i.e., the second relative positional relationship.

By calibrating the relative positional relationship between the target enclosure region and the to-be-machined object in the image, an approximate region of the to-be-machined object in the machining surface can be positioned, and the size of the to-be-machined object can be calculated by using the principles such as triangulation based on the position region of the calibrated image in the machining surface and the second relative position, so as to determine the actual shape and position of the to-be-machined object.

In some embodiments, S3242, calculating the second relative positional relationship based on the first relative positional relationship includes:

calculating a third relative positional relationship based on the first relative positional relationship, the third relative positional relationship is a distance in the vertical direction between the shooting device and the position marking point, the position marking point is in the same height as a plane where the to-be-machined object is placed;

obtaining a material thickness of the to-be-machined object; and calculating the second relative positional relationship based on the third relative positional relationship and the material thickness.

The third relative positional relationship is the distance between the shooting device and the position marking point in the vertical direction, i.e., the height of the shooting device relative to the machining surface.

Figure 4:
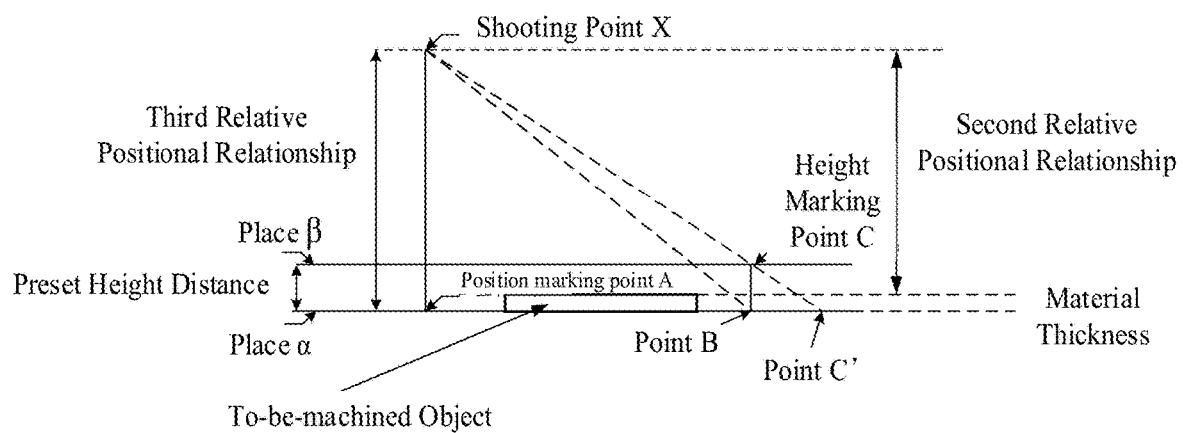
FIG. 4 is a schematic diagram between a second relative positional relationship and a third relative positional relationship.

FIG. 4 is a schematic diagram of the second relative positional relationship and the third relative positional relationship, in which the shooting point X is a shooting point of the camera, the point A is a position marking point, the point C is a height marking point, the position marking point A is provided in the plane α, and the height marking point C is correspondingly provided in the plane β, the point C' is a projection point of the point C in the plane α under the view angle of the camera at the shooting point X. The carrier of the point C intersects with the point B in the plane α. Since the position marking point is in the same height as the plane where the to-be-machined object is placed, the difference between the second relative positional relationship and the third relative positional relationship mainly depends on the thickness of the to-be-machined object.

In one embodiment, the present embodiment can calculate the third relative positional relationship by using principles such as triangulation based on the first relative positional relationship between the position marking points and the height marking points in the calibrated image, and the height difference between the position marking point and the height marking point. The material thickness of the to-be-machined object is known, and the distance (i.e., the third relative positional relationship) between the shooting device and the position marking point in the vertical direction is subtracted by the material thickness to obtain the distance (i.e., the second relative positional relationship) between the shooting device and the to-be-machined object in the vertical direction, which makes it easy to recognize the position and size of the to-be-machined object based on the second relative positional relationship and the calibrated image.

The height difference between the position marking point and the height marking point is a preset height difference, and in some embodiments, calculating the third relative positional relationship based on the first relative positional relationship includes:

obtaining an actual relative positional relationship between the position marking point and the height marking point in the machining region; and calculating the third relative positional relationship based on the actual relative positional relationship, the first relative positional relationship, and the preset height difference.

In one embodiment, the actual relative positional relationship between the position marking point and the height marking point in the machining region is known. The third relative positional relationship is calculated by using principles such as triangulation based on the actual relative positional relationship, the first relative positional relationship and the preset height difference. For example, a focal length corresponding to the initial image captured by the shooting device may be obtained, an angle difference between the position marking point and the height marking point when the shooting device shoots may be calculated based on the first relative positional relationship and the focal length. Combining the actual relative positional relationship, the preset height difference between the position marking point and the height marking point, and the angle difference, the shooting height (i.e., the third relative positional relationship) of the camera from the position coordinate point may be obtained by the principle of similar triangulation.

In some embodiments, the actual relative positional relationship between one of the position marking points and the height marking point may be obtained, the first relative positional relationship between the corresponding one of the position marking points and the height marking point in the calibrated image may be obtained, and then the third relative positional relationship is calculated by the principle of similar triangulation. In other embodiments, the actual relative positional relationship between a plurality of the position marking points (e.g., two, three, etc.) and the height marking points may be obtained, the first relative positional relationship between the corresponding plurality of the position marking points and the height marking points in the calibrated image may be obtained, and then the third relative positional relationship can be calculated by the principle of similar triangulation. Combined with the actual spatial positional relationship and the relative positional relationship between the plurality of the position marking points and the height marking points, the third positional relationship obtained is more accurate.

Figure 5:
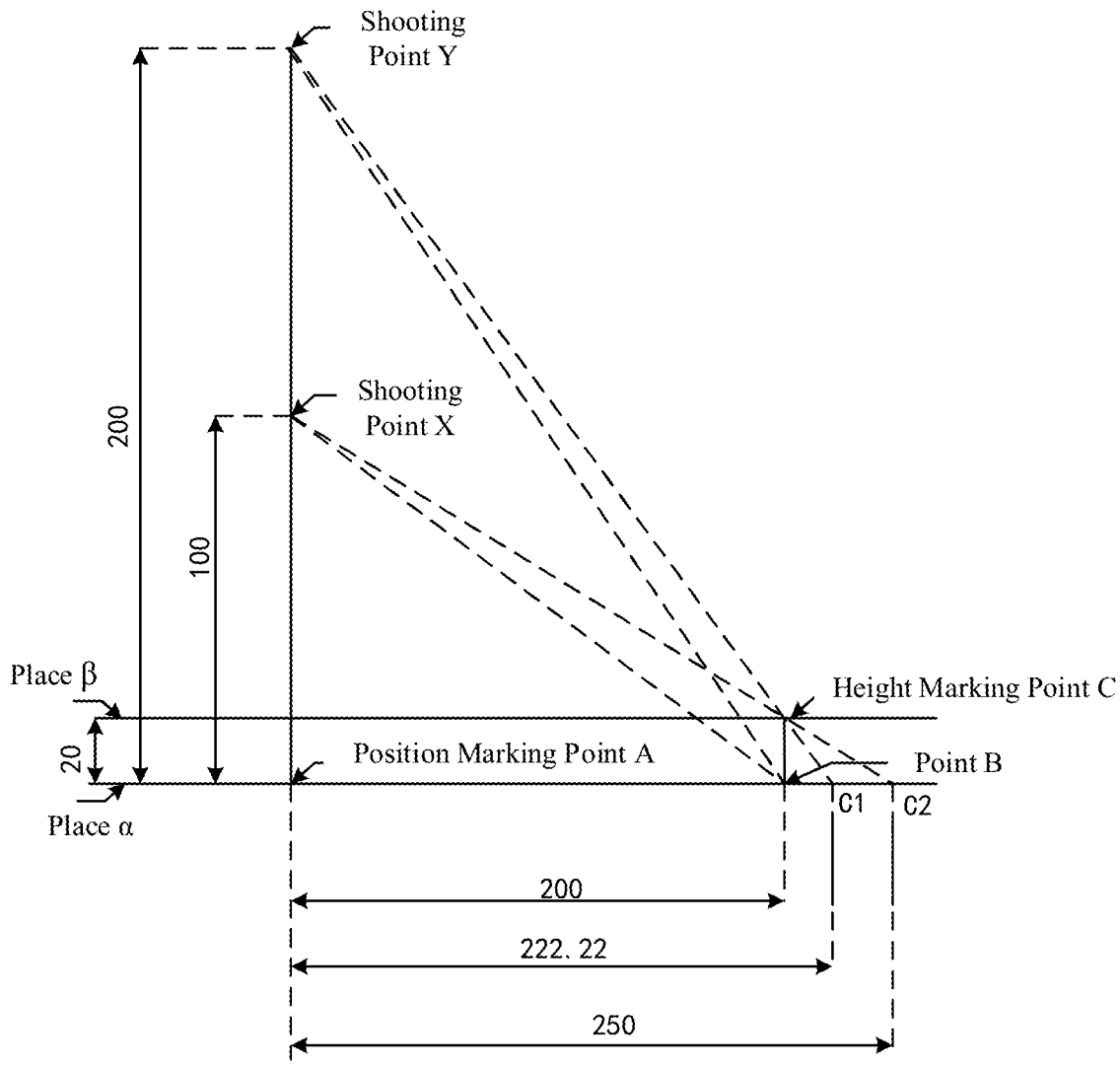
FIG. 5 is a schematic diagram of the principle of triangulation.

As an optional embodiment, FIG. 5 is a schematic diagram of the principle of triangulation, as shown in FIG. 5, which includes a shooting point X, a shooting point Y, a plane α, a plane β, a position marking point A, and a height marking point C. There is a height difference between the height marking point C and the position marking point A.

The position marking point A is located in the plane α, the height marking point C is correspondingly located in the plane β, the carrier of the height marking point C intersects with the plane α at the point B, which is offset by 200 mm relative to the position marking point A. The shooting point X and the shooting point Y can be used as the position of the shooting device, with 100 mm and 200 mm distances from the plane α, respectively. Since the height marking point C has a height of 20 mm from the plane α, when the plane α is shoot at different heights, the projection points of the height marking point C on the plane α are different, and thus the shooting height can be measured by the principle of triangulation based on the distance between the height marking point C and the position marking point A, the distance between the point B and the position marking point A, the height of the height marking point C, and the actual distance between the height marking point C and the position marking point A in the machining region in the shooting image. For example, in combination with FIG. 5, when shooting from the shooting point X, a ratio of the distance between the position marking point A and the point B to the distance between the position marking point A and the projection point C2 of the height marking point C in the plane α is 200:250. When shooting from the shooting point Y, a ratio of the distance between the position marking point A and the point B to the distance between the position marking point A and the projection point C1 of the height marking point C in the plane α is 200:222.22. When shooting at different heights, the distance between the position marking point A and the projection point of the height marking point C in the plane α in the corresponding image are different, and the distance between the position marking point A and the point B is proportionally changed with the shooting height, based on which the shooting height can be measured by the principle of triangulation.

In some embodiments, recognizing the size and the position of the to-be-machined object based on the second relative positional relationship and the target enclosure region, includes:

recognizing the size of the to-be-machined object and the position of the to-be-machined object in the machining region using a principle of triangulation based on the second relative positional relationship, and a relative positional relationship between the to-be-machined object and the target enclosure region in the calibrated image.

Specifically, the size of the to-be-machined object can be determined using the principle of triangulation based on the relative positional relationship between the edge of the to-be-machined object and the target graphic, and the second relative positional relationship. The position of the to-be-machined object in the machining surface can be determined based on the second relative positional relationship and the relative relationship between the target enclosure region and the edge of the to-be-machined object.

Further, on the basis of the above embodiment, initial images captured at different shooting points may be obtained, and the above steps S100 to S300 may be performed correspondingly to determine the size and position of the to-be-machined object based on the plurality of initial images, and the plurality of results are combined, so as to ultimately obtain shape data and position data of the object that are relatively more accurate, with a higher error tolerance rate.

After obtaining the shape data and the position data of the to-be-machined object, the position data is used to control a machining head to machine the to-be-machined object. The following embodiment provides how to minimize the impact of coordinate deviations between the motion system and the machining region on machining.

Figure 6:
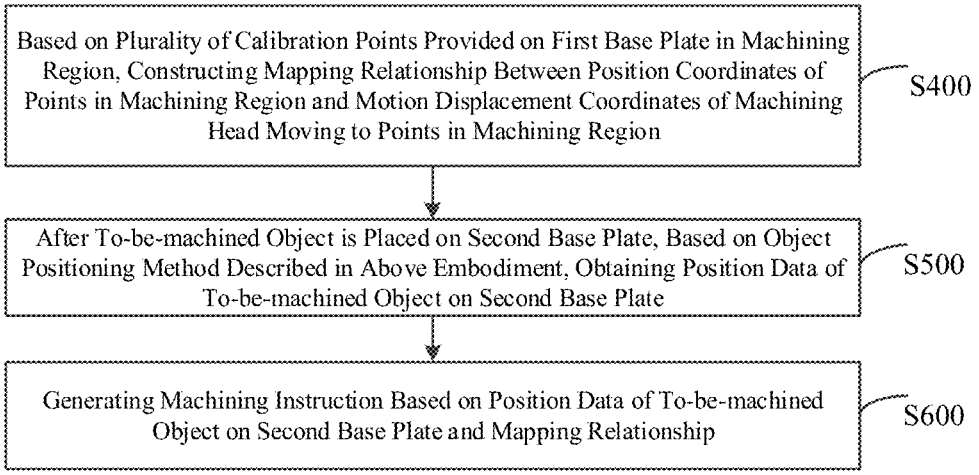
FIG. 6 is a flowchart of a machining method applying an object positioning method.

The present embodiment provides a machining method, which may obtain position data of the to-be-machined object by applying the object positioning method provided in the above embodiment. FIG. 6 is a flowchart of the machining method applying the object positioning method.

As shown in FIG. 6, the machining method provided in this embodiment includes steps S400 to S600:

S400, based on a plurality of calibration points provided on a first base plate in the machining region, constructing a mapping relationship between position coordinates of points in the machining region and motion displacement coordinates of a machining head moving to the points in the machining region.

Since there may be deviations between the coordinates in the machining region and the displacement coordinates of the motion system, the machining accuracy is thereby affected.

A first base plate is provided in the machining region, and the coordinate points are calibrated via the first base plate to reduce the effect of coordinate deviations on machining. Therefore, after the to-be-machined object is positioned and recognized, and before the to-be-machined object is machined, a mapping relationship is constructed between the displacement coordinates of the machining point and the motion displacement coordinates of the machining head, so as to improve the accuracy during subsequent machining.

The first base plate may be provided with a plurality of calibration points, and the coordinate data of each calibration point is known. In constructing the mapping relationship, the position of the machining head moving to each calibration point on the first floor plate can be controlled, and the change in the movement coordinates of the machining head during movement can be obtained, and the motion displacement coordinates of the machining head moving to each calibration point can be correlated with the coordinate data of the calibration point on the first floor. The mapping relationship between the position coordinate of each calibration point on the first floor plate and the motion displacement coordinates of the machining head moving to each corresponding point on the first floor plate can be constructed by fitting, etc.

The machining head may be a laser head or a cutter head, etc., which are not listed here.

S500, after the to-be-machined object is placed on the second base plate, based on the object positioning method described in the above embodiment, obtaining the position data of the to-be-machined object on the second base plate.

For example, the step S500 includes:

S501, obtaining an initial image of the machining region when the to-be-machined object is placed in the machining region, and the machining region is provided with a position marking point and a height marking point around the to-be-machined object;

S502, obtaining position data of the to-be-machined object on the second base plate based on the position marking point and the height marking point in the initial image; and S503, recognizing the size of the to-be-machined object and the position of the to-be-machined object in the machining region based on the position marking point and the height marking point in the initial image.

The execution process of S501-S503 is referred to the corresponding steps S100 to S300 in the object positioning method provided in the above embodiment. The machining region includes a second base plate, what is obtained is an initial image of the to-be-machined object on the second base plate, and what is recognized by the step S503 is the position data of the to-be-machined object placed on the second base plate. The initial image includes a position marking point and a height marking point provided on the second base plate, and the position data of the to-be-machined object placed on the second base plate is determined by recognizing the position marking point and the height marking point on the second base plate.

Further, the first base plate and the second base plate may be the same base plate or two base plates, and the first base plate may be provided on the second base plate, and the second base plate may be provided on the first base plate, or one of the first base plate and the second base plate may be provided in the machining device. For example, one of the first base plate and the second base plate is provided within the machining device, and when performing step S400, the first base plate is placed within the machining device, and when performing step S500, the second base plate is provided within the machining device. For example, if both the first base plate and the second base plate are provided, the first base plate or the second base plate may be presented by means of disassembly.

As an optional embodiment, the second base plate may be provided with marking points for positioning, by which position data of the to-be-machined object can be obtained. Alternatively, an alignment device may be provided in the machining device, and the position data of the to-be-machined object can be obtained by the alignment device aligning the to-be-machined material. The position data of the to-be-machined object may include the size of the to-be-machined object and the position of the to-be-machined object in the second base plate.

S600, generating a machining instruction based on the position data of the to-be-machined object on the second base plate and the mapping relationship. As an optional embodiment, a position marking point and a height marking point may be provided on the second base plate.

Specifically, the machining instructions are used to control the movement of the machining head to machine the to-be-machined object. The position data can determine the position of the to-be-machined object in the machining region and the shape and size of the to-be-machined object. The position data of the to-be-machined object in the motion system can be obtained through the mapping relationship, which can generate accurate machining instructions, so that the machining trajectory of the machining head according to the machining instructions corresponds to the machining range of the to-be-machined object to ensure the machining accuracy.

In this embodiment, a mapping relationship between the position coordinate of each point in the machining region and the motion displacement of the machining head moving to each point in the machining region is constructed by the plurality of calibration points on the first base plate, so that when machining is performed, based on the position data of the to-be-machined object in the second base plate obtained in step S500 and the mapping relationship, the machining instructions are generated, and the to-be-machined object is machined based on the machining instructions. As a result, the machining instructions are more accurate, and accurate machining of the to-be-machined object is realized, i.e., the present embodiment solves, to a certain extent, the machining deviation caused by the inconsistency between the movement coordinates of and the coordinates in the machining region, which is conducive to improving the machining accuracy.

Further, step S400, based on the plurality of calibration points provided on the first base plate in the machining region, constructing the mapping relationship between position coordinates of points in the machining region and motion displacement coordinates of a machining head moving to the points in the machining region includes:

S410, controlling the movement of the machining head to align with the calibration points;

S420, obtaining base coordinates of the calibration point in the first base plate, and motion displacement coordinates of the machining head when moving to align with the calibration point; and S430, constructing a mapping relationship based on the base coordinates of the plurality of calibration points and the corresponding motion displacement coordinates.

Figure 7:
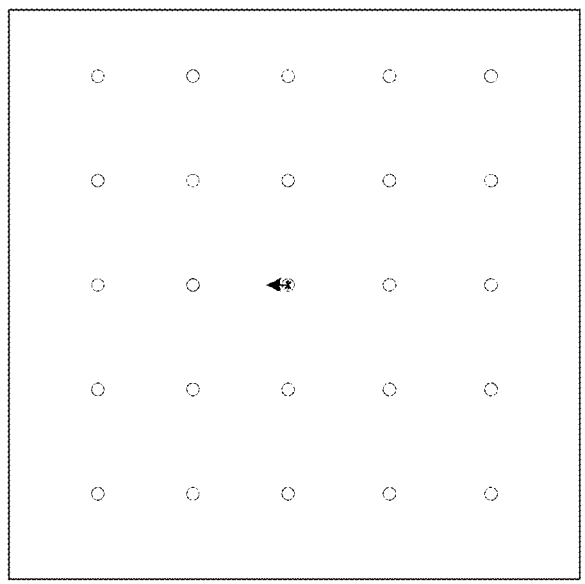
FIG. 7 is a schematic diagram of the effect of providing a calibration point on a first base plate according to some embodiments of the present disclosure.

FIG. 7 is a schematic diagram of the effect of setting the calibration points on the first base plate. The number of calibration points and the arrangement of the calibration points in FIG. 7 are only schematic, and should not limit the technical solution of the present embodiment.

The base coordinate of each calibration point on the first base plate is known. The machining head can be controlled to move to a position corresponding to the first calibration point, i.e., the machining head is aligned with the first calibration point, and the base coordinate of the first calibration point and the movement displacement coordinate of the machining head when moving to the first calibration point are recorded. For example, if the position coordinate of the first calibration point on the first base plate is (1,1), and the corresponding motion displacement coordinate of the machining head when being actually controlled to move to the first calibration point is (1.02, 0.98). The machining head is then controlled to move to align with the second calibration point, while the base coordinate of the second calibration point and the corresponding motion displacement coordinate are recorded. The base coordinates of a sufficient number of calibration points and corresponding motion displacement coordinates are recorded sequentially, and then a mapping relationship is constructed based on the base coordinates of a plurality of calibration points and the corresponding motion displacement coordinates. The mapping relationship between the base coordinates of the calibration points and the motion displacement coordinates can be determined by fitting.

Taking the machining head is a laser head as example, the alignment is to align a light spot emitted by the laser head with the calibration point.

As an optional embodiment, the plurality of calibration points are arrayed on the first base plate; and/or, the number of calibration points is positively correlated with the machining accuracy level.

The higher the machining accuracy, the more calibration points on the first base plate, the higher the number of calibration points required for constructing the mapping relationship, and thus, the higher the accuracy of the mapping relationship established based on the calibration points on the first base plate, i.e., the lower the error of the machining device in controlling the movement of the machining head. It can be understood that when a higher number of calibration points are used for establishing the mapping relationship, the control error of the machining device can be reduced to a lower level. In practical application, the user may determine the number of calibration points to be used for establishing the above mapping relationship according to the actual needs of the machining accuracy level, and then the mapping relationship is established according to the corresponding number of calibration points.

Optionally, as shown in FIG. 7, the plurality of calibration points are arrayed on the first base plate. The array arrangement may be arranged in the form of N rows and M columns, thus the movement of the machining head during calibration is smoother, while the calibration efficiency is relatively higher.

Further, step S600, generating the machining instruction based on the position of the to-be-machined object in the machining region and the mapping relationship, and controlling the machining head to machine the to-be-machined object based on the machining instruction includes:

S610, based on the position of the to-be-machined object in the machining region and the mapping relationship, determining a coordinate range of the to-be-machined object in a machining head motion system; and S620, generating the machining instruction based on the coordinate range.

Specifically, the coordinates of the machining region where the to-be-machined object needs to be machined can be obtained, and the coordinate range of the to-be-machined object in the machining head motion system can be calculated according to the coordinate data of the machining region and the mapping relationship, and based on this coordinate range, the machining path can be planned to generate the machining instruction, so as to accurately process the to-be-machined object.

It should be noted that the machining region where the to-be-machined object needs to be machined refers to the region where the machining positions on the to-be-machined object are located.

Figure 8:
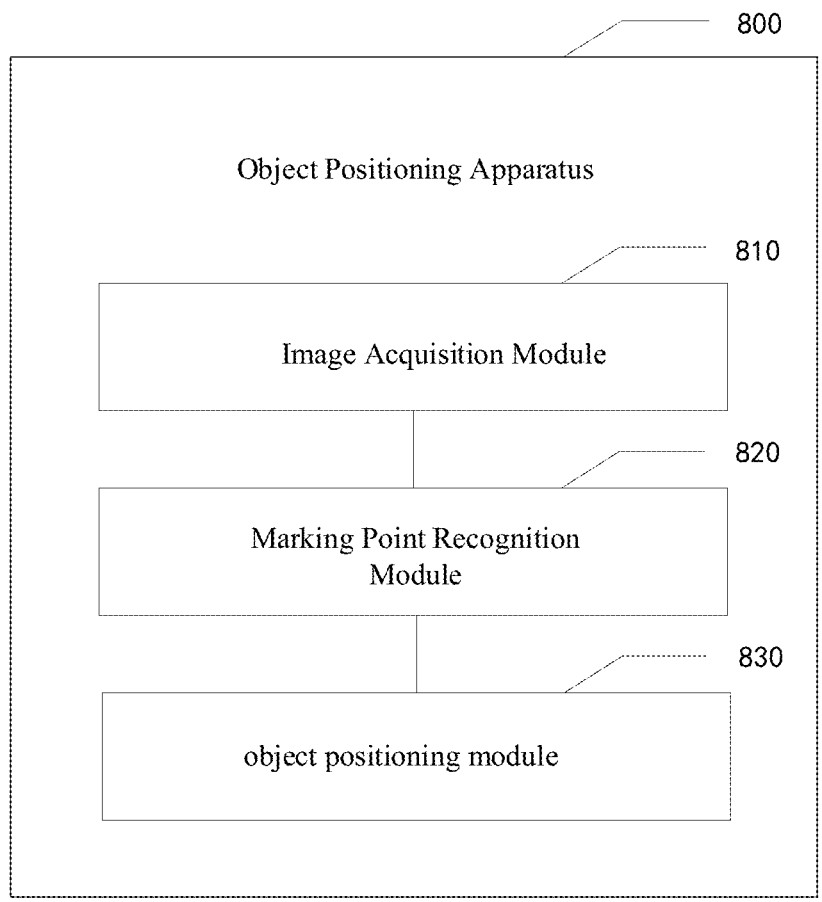
FIG. 8 schematically shows a block structural diagram of an object positioning device according to some embodiments of the present disclosure.

The following describes embodiments of apparatus of the present disclosure that can be used to perform the object positioning method in the above embodiments of the present disclosure. FIG. 8 schematically shows a structural block diagram of an object positioning apparatus provided by embodiments of the present disclosure. As shown in FIG. 8, the object positioning apparatus 800 includes:

- an image acquisition module 810, configured for obtaining an initial image of a machining region when a to-be-machined object is placed in the machining region, wherein the machining region is provided with a position marking point and a height marking point around the to-be-machined object;
- a marking point recognition module 820, configured for recognizing the position marking point and the height marking point contained in the initial image; and
- an object positioning module 830, configured for recognizing a size of the to-be-machined object and a position of the to-be-machined object in the machining region based on the position marking point and the height marking point in the initial image.

Further, in some embodiments, the object positioning module 730 includes:

- a determination unit, configured for determining an initial enclosure region in the initial image based on the position marking point in the initial image; and
- a recognition unit, configured for recognizing the size of the to-be-machined object and the position of the to-be-machined object in the machining region based on the relative positional relationship between the height marking point and the position marking point in the initial image, and the initial enclosure region.

Further, in some embodiments, the recognition unit includes:

- an image calibration parameter determination subunit, configured for comparing a shape of the initial enclosure region with a preset standard shape to determine image calibration parameters;
- an image calibration subunit, configured for calibrating the initial image based on the image calibration parameters to obtain a calibrated image;
- a target enclosure region determining subunit, configured for obtaining a target enclosure region formed by enclosure of a plurality of position marking points in the calibrated image; and
- a size and position recognition subunit, configured for recognizing the size of the to-be-machined object and the position of the to-be-machined object in the machining region based on the position marking point, the height marking point, and the target enclosure region in the calibrated image.

Further, in some embodiments, the size and position recognition subunit is configured for:

- obtaining a first relative positional relationship between the position marking point and the height marking point in the calibrated image;
- calculating a second relative positional relationship based on the first relative positional relationship, the second relative positional relationship is a distance in a vertical direction between the shooting device and the to-be-machined object; and
- recognizing the size of the to-be-machined object and the position of the to-be-machined object in the machining region based on the second relative positional relationship and the target enclosure region.

In some embodiments, the size and position recognition subunit is configured for:

- calculating a third relative positional relationship based on the first relative positional relationship, the third relative positional relationship is a distance in the vertical direction between the shooting device and the position marking point, and the position marking point is in a same height as a plane where the to-be-machined object is placed;
- obtaining a material thickness of the to-be-machined object; and
- calculating the second relative positional relationship based on the third relative positional relationship and the material thickness.

Further, in some embodiments, the shape and position recognition unit is configured for:

- obtaining an actual relative positional relationship between the position marking point and the height marking point in the machining region; and
- calculating the third relative positional relationship based on the actual relative positional relationship, the first relative positional relationship and the preset height difference.

Figure 9:
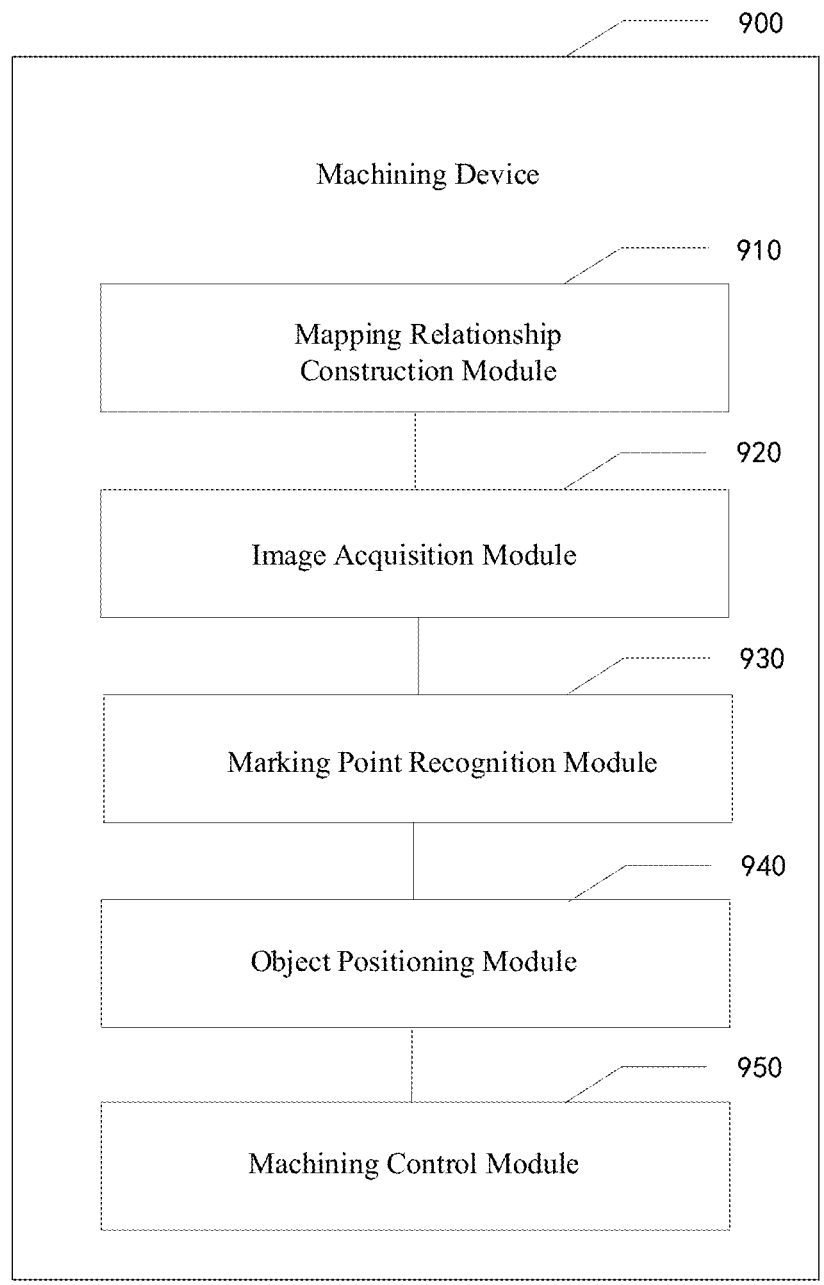
FIG. 9 schematically shows a block structural diagram of a machining device according to some embodiments of the present disclosure.

FIG. 9 schematically shows a structural block diagram of a machining device provided by embodiments of the present disclosure. As shown in FIG. 9, the machining device 900 includes:

- a mapping relationship construction module 910, configured for based on a plurality of calibration points provided on a first base plate in the machining region, constructing a mapping relationship between position coordinates of points in the machining region and motion displacement coordinates of a machining head moving to the points in the machining region;
- an image acquisition module 920, configured for after a to-be-machined object is placed on a second base plate, obtaining an initial image of the second base plate when the to-be-machined object is placed in the second base plate, wherein the second base plate is provided with a position marking point and a height marking point around the to-be-machined object;
- a marking point recognition module 930, configured for recognizing the position marking point and the height marking point contained in the initial image;
- an object positioning module 940, configured for obtaining position data of the to-be-machined object on the second base plate based on the position marking point and the height marking point in the initial image; and
- a machining control module 950, configured for generating a machining instruction based on the position data of the to-be-machined object on the second base plate and the mapping relationship.

In some embodiments, the image acquisition module 920, the marking point recognition module 930, and the object positioning module 940 may correspondingly implement functions of the image acquisition module 810, the marking point recognition module 820, and the object positioning module 830, respectively, that may be included in the above-described object positioning apparatus 800.

Further, the mapping relationship construction module includes:

- a machining head control unit, configured for controlling the machining head to move to align with the plurality of the calibration points;
- a coordinate acquisition unit, configured for obtaining base coordinates of the plurality of the calibration points on the first base plate, and the motion displacement coordinates of the machining head moving to align with the plurality of calibration points; and a mapping relationship construction unit, configured for constructing the mapping relationship based on the base coordinate and corresponding motion displacement coordinates of the plurality of calibration points.

Further, the machining control module includes:

a coordinate range determination unit, configured for determining a coordinate range of the to-be-machined object in a machining head motion system based on the position data of the to-be-machined object on the second base plate and the mapping relationship; and a machining instruction generation unit, configured for generating the machining instruction based on the coordinate range.

Figure 10:
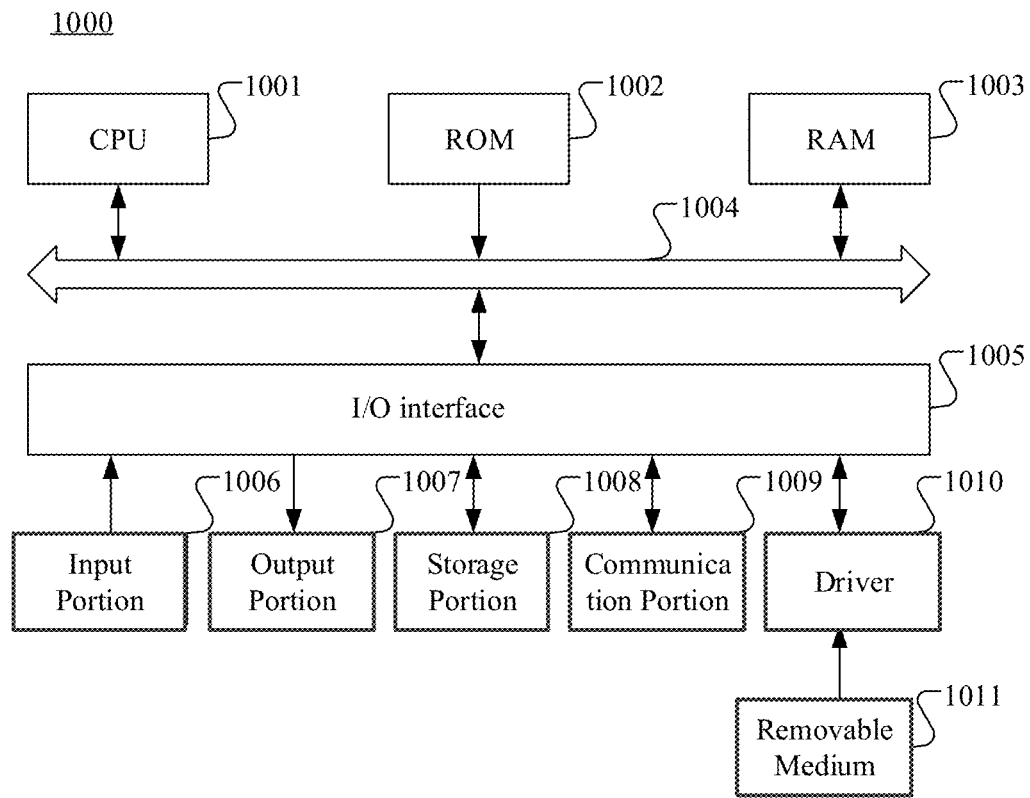
FIG. 10 schematically shows a block structural diagram of a computer system suitable for realizing an electronic device of the embodiments of the present disclosure.

FIG. 10 schematically shows is a structural block diagram of a computer system for implementing an electronic device of some embodiments of the present disclosure.

It should be noted that the computer system 1000 of the electronic device illustrated in FIG. 10 is only an example, and should not bring about any limitation on the functions and scope of use of the embodiments of the present disclosure.

As shown in FIG. 10, the computer system 1000 includes a Central Processing Unit 1001 (CPU) that can perform various appropriate actions and processes based on a program stored in a Read-Only Memory 1002 (ROM) or loaded from a storage portion 1008 into a Random Access Memory 1003 (RAM). Various programs and data necessary for the operation of the system are stored in the RAM 1003. The CPU 1001, the ROM 1002, and the RAM 1003 are connected to each other via a bus 1004. An input/output (I/O) interface 1005 is also connected to the bus 1004.

The following components connected to the input/output interface 1005 includes:

an input portion 1006 including a keyboard, a mouse, etc.; an output portion 1007 including a cathode ray tube (CRT), a liquid crystal display (LCD), and a speaker, etc.; a storage portion 1008 including a hard disc, etc.; and a communication portion 1009 including a network interface card such as a local area network (LAN) card, a modem, etc. The communication portion 1009 performs communication processing via a network such as the Internet. The driver 1010 is also connected to the input/output interface 1005 as needed. The removable medium 1011, such as discs, CD-ROMs, magnetic discs, semiconductor memories, etc., are mounted on the driver 1010 as needed, so that computer programs read therefrom are mounted into the storage portion 1008 as needed.

In particular, according to embodiments of the present disclosure, the processes depicted in each method flowchart may be implemented as computer software programs. For example, embodiments of the present disclosure include a computer program product including a computer program carried on a computer-readable medium, the computer program including a program code for performing the method shown in the flowchart. In such embodiments, the computer program may be downloaded and installed from a network via communication portion 1009, and/or installed from removable medium 1011. Upon execution of the computer program by the central processor 1001, various functions defined in the system of the present disclosure are performed.

It should be noted that the computer-readable medium shown in embodiments of the present disclosure may be a computer-readable signal medium or a computer-readable storage medium or any combination thereof. The computer-readable storage medium may, for example, be—but is not limited to—a system, device, or apparatus, or device of electricity, magnetism, light, electromagnetism, infrared, or semiconductors, or any combination of the above. More specific examples of computer-readable storage medium may include, but are not limited to: an electrical connection having one or more wires, a portable computer disk, a hard disk, a RAM, a ROM, an erasable programmable read only memory (EPROM), flash memory, optical fiber, portable compact disc read-only memory (CD-ROM), optical storage devices, magnetic storage devices, or any suitable combination of the foregoing. In the context of the present disclosure, a computer-readable storage medium may be any tangible medium containing or storing a program that may be used by or in combination with an instruction execution system, apparatus, or device. And in the context of the present disclosure, a computer-readable signal medium may include a data signal propagated in a baseband or as part of a carrier that carries computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a program for use by, or in combination with, an instruction-executing system, apparatus, or device. The program code contained on the computer-readable medium may be transmitted using any suitable medium, including, but not limited to: wireless, wired, etc., or any suitable combination of the foregoing.

The flowcharts and block diagrams in the accompanying drawings illustrate the architecture, functionality, and operation of systems, methods, and computer program products that may be implemented in accordance with various embodiments of the present disclosure. At this point, each box in the flowcharts or block diagrams may represent a module, program segment, or portion of code, and the module, program segment, or portion of code contains one or more executable instructions for carrying out a specified logical function. It should also be noted that in some implementations as replacements, the functions indicated in the boxes may also occur in a different order than that indicated in the accompanying drawings. For example, two consecutively represented boxes may actually be executed substantially in parallel, and they may sometimes be executed in reverse order, depending on the function involved. It should also be noted that each box in a block diagram or flowchart, and combinations of boxes in a block diagram or flowchart, may be implemented with a dedicated hardware-based system that performs the specified function or operation, or may be implemented with a combination of dedicated hardware and computer instructions.

It should be noted that although a number of modules or units of the device for action execution are mentioned in the detailed description above, this division is not mandatory. Indeed, according to embodiments of the present disclosure, the features and functions of two or more modules or units described above may be specified in a single module or unit. Conversely, the features and functions of one module or unit described above may be further divided to be materialized by more than one module or unit.

By the above description of the embodiments, it is readily understood by those skilled in the art that the embodiments described herein may be realized by means of software, or by means of software in combination with the necessary hardware. Thus, the technical solution according to the presently disclosed embodiments may be embodied in the form of a software product that may be stored in a nonvolatile storage medium (which may be a CD-ROM, a USB flash drive, a removable hard disc, etc.) or on a network, and that includes a number of instructions to cause a computing device (which may be a personal computer, a server, a touch device, or a network device, etc.) to perform a method according to the presently disclosed embodiments.

Other embodiments of the present disclosure will readily come to mind to those skilled in the art upon consideration of the specification and practice of the invention disclosed herein. The present disclosure is intended to cover any variations, uses, or adaptations of the present disclosure that follow the general principles of the present disclosure and include means of common knowledge or those skilled in the art not disclosed herein.

It is to be understood that the present disclosure is not limited to the precise structure which has been described above and illustrated in the accompanying drawings, and that various modifications and changes may be made without departing from its scope. The scope of the present disclosure is limited only by the appended claims.

What is claimed is:

1. An object positioning method, comprising:
obtaining an initial image of a machining region when a to-be-machined object is placed in the machining region, wherein the machining region is provided with a position marking point and a height marking point around the to-be-machined object, the position marking point and the height marking point are located at different heights, and a height difference between the height marking point and the position marking point is known;
recognizing the position marking point and the height marking point contained in the initial image; and
recognizing a size of the to-be-machined object and a position of the to-be-machined object in the machining region based on the position marking point and the height marking point in the initial image.

2. The object positioning method according to claim 1, wherein the initial image comprises at least N different position marking points, wherein N is greater than 2, wherein a value of N is related to direction attributes of the position marking points, and each direction attribute is a number of directions indicated by the position marking points; and/or
a plurality of position marking points are enclosed to form a uniquely determined graphic; and/or
the machining region is located within a machining device and the initial image is captured by a device independent of the machining device.

3. The object positioning method according to claim 1, wherein recognizing the size of the to-be-machined object and the position of the to-be-machined object in the machining region based on the position marking point and the height marking point in the initial image comprises:
recognizing the size of the to-be-machined object and the position of the to-be-machined object in the machining region based on a relative positional relationship between the to-be-machined object and the position marking point, and a relative positional relationship between the height marking point and the position marking point in the initial image.

4. The object positioning method according to claim 3, wherein recognizing the size of the to-be-machined object and the position of the to-be-machined object in the machining region based on the relative positional relationship between the to-be-machined object and the position marking point, and the relative positional relationship between the height marking point and the position marking point in the initial image comprises:
determining an initial enclosure region in the initial image based on the position marking point in the initial image; and
recognizing the size of the to-be-machined object and the position of the to-be-machined object in the machining region based on the relative positional relationship between the height marking point and the position marking point in the initial image, and the initial enclosure region.

5. The object positioning method according to claim 4, wherein recognizing the size of the to-be-machined object and the position of the to-be-machined object in the machining region based on the relative positional relationship between the height marking point and the position marking point in the initial image, and the initial enclosure region comprises:
comparing a shape of the initial enclosure region with a preset standard shape to determine image calibration parameters;
calibrating the initial image based on the image calibration parameters to obtain a calibrated image;
obtaining a target enclosure region formed by enclosure of a plurality of position marking points in the calibrated image; and
recognizing the size of the to-be-machined object and the position of the to-be-machined object in the machining region based on the position marking point, the height marking point, and the target enclosure region in the calibrated image.

6. The object positioning method according to claim 5, wherein the initial image is obtained by shooting a photo by a shooting device, and recognizing the size of the to-be-machined object and the position of the to-be-machined object in the machining region based on the position marking point, the height marking point, and the target enclosure region in the calibrated image comprises:
obtaining a first relative positional relationship between the position marking point and the height marking point in the calibrated image;
calculating a second relative positional relationship based on the first relative positional relationship, wherein the second relative positional relationship is a distance in a vertical direction between the shooting device and the to-be-machined object; and
recognizing the size of the to-be-machined object and the position of the to-be-machined object in the machining region based on the second relative positional relationship and the target enclosure region.

7. The object positioning method according to claim 6, wherein calculating the second relative positional relationship based on the first relative positional relationship comprises:
calculating a third relative positional relationship based on the first relative positional relationship, wherein the third relative positional relationship is a distance in the vertical direction between the shooting device and the position marking point, and the position marking point is in a same height as a plane where the to-be-machined object is placed;
obtaining a material thickness of the to-be-machined object; and
calculating the second relative positional relationship based on the third relative positional relationship and the material thickness.

8. The object positioning method according to claim 7, wherein a height difference between the position marking point and the height marking point in the machining region is a preset height difference, and calculating the third relative positional relationship based on the first relative positional relationship comprises:
- obtaining an actual relative positional relationship between the position marking point and the height marking point in the machining region; and
- calculating the third relative positional relationship based on the actual relative positional relationship, the first relative positional relationship and the preset height difference.

9. The object positioning method according to claim 1, wherein the plurality of position marking points are provided, the plurality of position marking points have different markings; and/or
- the position marking point and the height marking point have different markings.

10. A machining method, comprising:
- based on a plurality of calibration points provided on a first base plate in the machining region, constructing a mapping relationship between position coordinates of points in the machining region and motion displacement coordinates of a machining head moving to the points in the machining region;
- after a to-be-machined object is placed on a second base plate, obtaining position data of the to-be-machined object on the second base plate based on an object positioning method; and
- generating a machining instruction based on the position data of the to-be-machined object on the second base plate and the mapping relationship;

wherein the object positioning method comprises:
- obtaining an initial image of a machining region when a to-be-machined object is placed in the machining region, wherein the machining region is provided with a position marking point and a height marking point around the to-be-machined object;
- recognizing the position marking point and the height marking point contained in the initial image; and
- recognizing a size of the to-be-machined object and a position of the to-be-machined object in the machining region based on the position marking point and the height marking point in the initial image.

11. The machining method according to claim 10, wherein based on the plurality of calibration points provided on the first base plate in the machining region, constructing the mapping relationship between position coordinates of points in the machining region and motion displacement coordinates of the machining head moving to the points in the machining region comprises:
- controlling the machining head to move to align with the plurality of calibration points;
- obtaining base coordinates of the plurality of calibration points on the first base plate, and the motion displacement coordinates of the machining head moving to align with the plurality of calibration points; and
- constructing the mapping relationship based on the base coordinates and corresponding motion displacement coordinates of the plurality of calibration points.

12. The machining method according to claim 10, wherein the plurality of calibration points are arrayed on the first base plate.

13. The machining method according to claim 10, wherein a number of the plurality of calibration points is positively correlated with a machining accuracy level.

14. The machining method according to claim 10, wherein generating the machining instruction based on the position data of the to-be-machined object on the second base plate and the mapping relationship comprises:
- determining a coordinate range of the to-be-machined object in a machining head motion system based on the position data of the to-be-machined object on the second base plate and the mapping relationship; and
- generating the machining instruction based on the coordinate range.

15. An object positioning apparatus, comprising:
- an image acquisition module, configured for obtaining an initial image of a machining region when a to-be-machined object is placed in the machining region, wherein the machining region is provided with a position marking point and a height marking point around the to-be-machined object, the position marking point and the height marking point are located at different heights, and a height difference between the height marking point and the position marking point is known;
- a marking point recognition module, configured for recognizing the position marking point and the height marking point contained in the initial image; and
- an object positioning module, configured for recognizing a size of the to-be-machined object and a position of the to-be-machined object in the machining region based on the position marking point and the height marking point in the initial image.

16. An electronic device, comprising: a memory, a processor and an object positioning program stored on the memory and operable on the processor, wherein the object positioning program, when executed by the processor, implements the object positioning method of claim 1.

17. A non-transitory computer readable storage medium, on which a computer program is stored on, wherein the computer program, when executed by the processor, implements the object positioning method of claim 1.

18. An electronic device, comprising: a memory, a processor and an object positioning program stored on the memory and operable on the processor, wherein the object positioning program, when executed by the processor, implements the machining method of claim 10.

19. A non-transitory computer readable storage medium, on which a computer program is stored on, wherein the computer program, when executed by a processor, implements the machining method of claim 10.

20. The object positioning method according to claim 1, wherein the initial image is obtained by capturing the machining region with a shooting device, the shooting device is either a camera installed inside the machining device or a handheld shooting device.

* * * * *